United States Patent [19]

Fletcher et al.

[11] 4,046,462
[45] Sept. 6, 1977

[54] THREE-DIMENSIONAL TRACKING SOLAR ENERGY CONCENTRATOR AND METHOD FOR MAKING SAME

[76] Inventors: James C. Fletcher, Administrator of the National Aeronautics and Space Administration, with respect to an invention of; Charles G. Miller, Pasadena; Jens G. Pohl, San Luis Obispo, both of Calif.

[21] Appl. No.: 681,017

[22] Filed: Apr. 28, 1976

[51] Int. Cl.² ........................ G02B 5/10; E04G 11/04
[52] U.S. Cl. .................................... 350/295; 350/320; 427/130; 427/47; 52/2
[58] Field of Search ............... 350/295, 320, 296; 343/915; 52/2; 427/163, 47, 130

[56] References Cited

U.S. PATENT DOCUMENTS

| | | | |
|---|---|---|---|
| 3,353,309 | 11/1967 | Kwake | 52/2 |
| 3,420,469 | 1/1969 | Johnson et al. | 350/295 |
| 3,605,107 | 9/1971 | Amboss | 343/915 |
| 3,972,600 | 8/1976 | Cobarg | 350/295 |

Primary Examiner—Jon W. Henry
Attorney, Agent, or Firm—Monte F. Mott; Wilfred Grifka; John R. Manning

[57] ABSTRACT

A tracking three-dimensional solar energy concentrator is provided by a stretched aluminized polymeric membrane supported by a hoop, the polymeric membrane being formed to a desired curvature by differential loading. The loading on the polymeric membrane determines its curvature. The loading can be varied by utilizing a plastic membrane that has a non-uniform radial distribution of thickness with uniform differential pressure or by applying a non-uniform differential pressure on a membrane having uniform thickness. Reflector membranes having a non-uniform radial distribution of thickness can be obtained by selective spraying of a dissolved plastic such as Krylon on the underside of the aluminized membrane. A non-uniform differential pressure is obtained by using a uniform differential pressure in combination with localized electrostatic or magnetic pressure. The membrane concentrator and its supporting equipment is maintained in a slightly pressurized spherical-cap envelope of transparent plastic to protect the concentrator from the elements.

9 Claims, 9 Drawing Figures

U.S. Patent  Sept. 6, 1977  Sheet 2 of 2  4,046,462
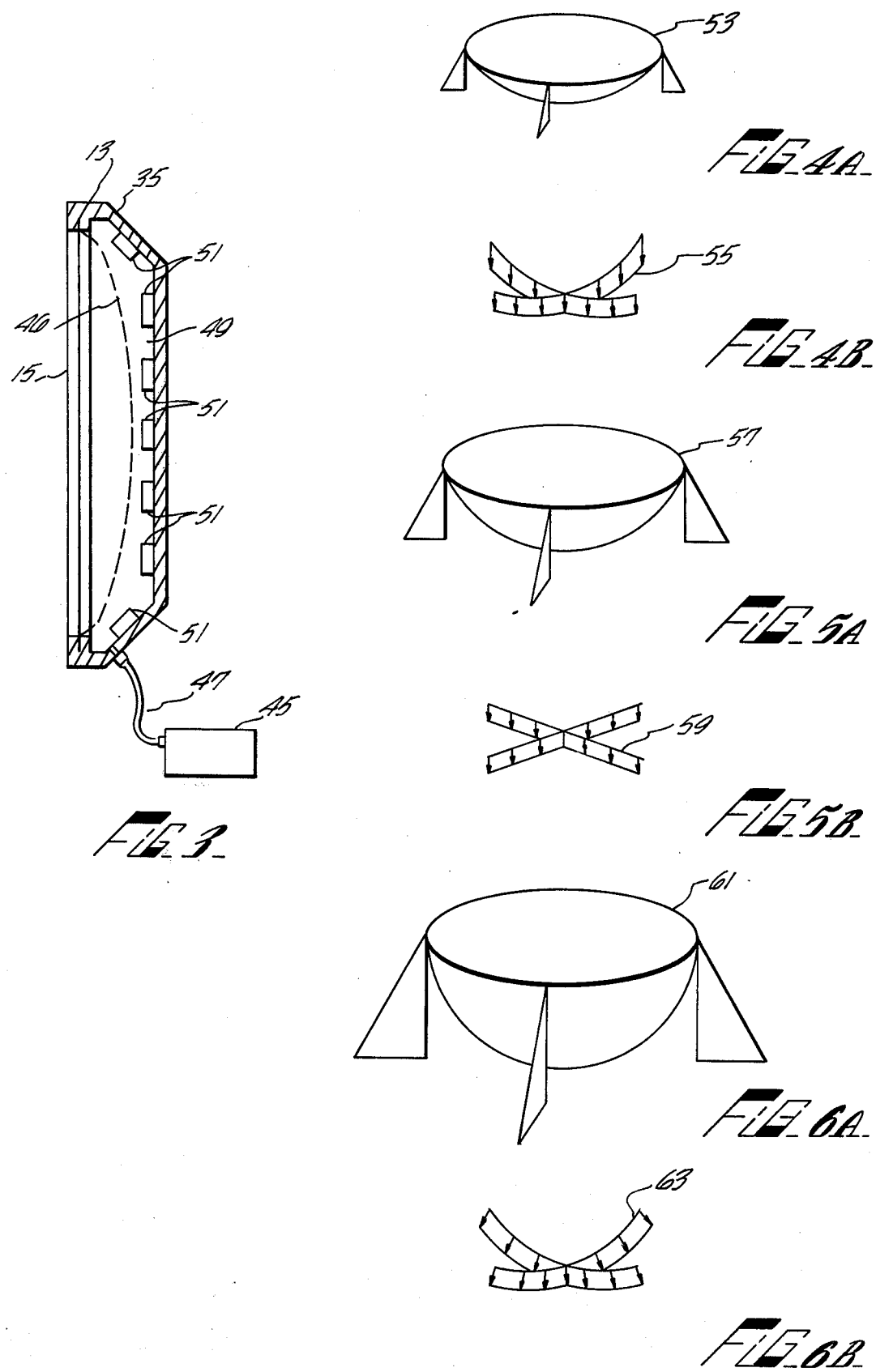

4,046,462

THREE-DIMENSIONAL TRACKING SOLAR ENERGY CONCENTRATOR AND METHOD FOR MAKING SAME

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The present invention relates generally to improvements in three-dimensional solar energy concentrators. More particularly, it pertains to new and improved three-dimensional tracking solar energy concentrators wherein the solar reflecting surface thereof is formed from an elastic reflecting material having differential pressure acting thereon.

Currently favored technology for the collection of solar energy in the range of 600° F and above for producing superheated steam for use by boiler-generator equipment that in turn produces electric power requires tracking three-dimensional concentrators such as three-dimensional paraboloid dishes which can be precisely steered in both elevation and azimuth in order to follow the movement of the sun. Accurate tracking devices that are to track under conditions of weather extremes and in varying high wind forces on large three-dimensional concentrators are expensive to construct and costly to maintain. In order to provide the high temperature output needed by central station power plants for power production in the multi-megawatt range, a three-dimensional tracking system is required. To date, the cost of an associated tracking mechanism which has to be sturdy enough to withstand the expected windage forces has made the entire concept uneconomical. This problem is compounded by the fact that a solar energy collection system may utilize literally thousands of 20 ft. diameter parabolic concentrators, each with its associated tracking mechanism.

SUMMARY OF THE INVENTION

A stretched aluminized polymeric membrane supported by a hoop is formed to a desired curvature by evenly distributed adjustable differential pneumatic loading in combination with adjustable local loading. The loading on the face of the membrane is varied either by providing a non-uniform radial distribution of thickness with uniform pressure, or by applying a non-uniform pressure on a membrane of relatively uniform thickness. Reflector membranes having a non-uniform radial distribution of thickness can be obtained by selectively spraying a liquid plastic on the underside of the membrane. Alternately, non-uniform pressure on the face of the membrane is provided by a uniform differential pneumatic pressure in combination with localized electrostatic or magnetic pressure. The polymeric membrane reflector and its supporting and steering equipment is maintained in a slightly pressurized spherical-cap envelope of transparent plastic to protect them from windage forces and precipitation.

BRIEF DESCRIPTION OF THE DRAWINGS

Other objects and many of the attendant advantages of this invention will be readily appreciated as the same becomes better understood with reference to the following detailed description when considered in conjunction with the accompanying drawings in which like reference numerals designate like parts throughout the figures thereof and wherein;

FIG. 3 is a cross-sectional view of the three-dimensional concentrator of the present invention.

FIG. 4A is an illustration of a curvature which may be desired for the three-dimensional concentrator of the present invention.

FIG. 4B is a load diagram illustrating the forces required on the surface of the reflector film to obtain the curvature illustrated in FIG. 4A.

FIG. 5A is an illustration of a different curvature which may be desired for the three-dimensional concentrator of the present invention.

FIG. 5B is a load diagram illustrating the forces required on the surface of the reflector film to obtain the curvature illustrated in FIG. 5A.

FIG. 6A is an illustration of a curvature which may be desired for the concentrator of the present invention.

FIG. 6B is a load diagram illustrating the forces required on the surface of the reflector film to obtain the curvature illustrated in FIG. 6A.

DESCRIPTION OF THE PREFERRED EMBODIMENTS

Figure 1:
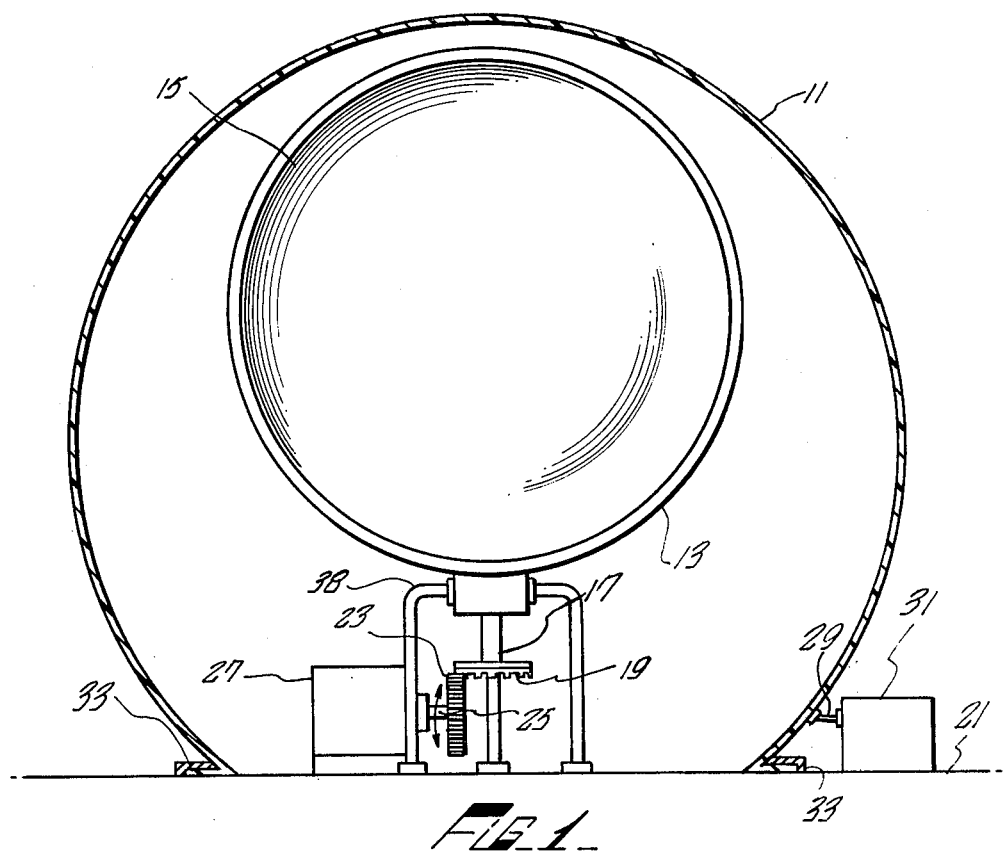
FIG. 1 is a diagramatic illustration of the front of a three-dimensional tracking concentrator in a pressurized transparent dome.
Figure 2:
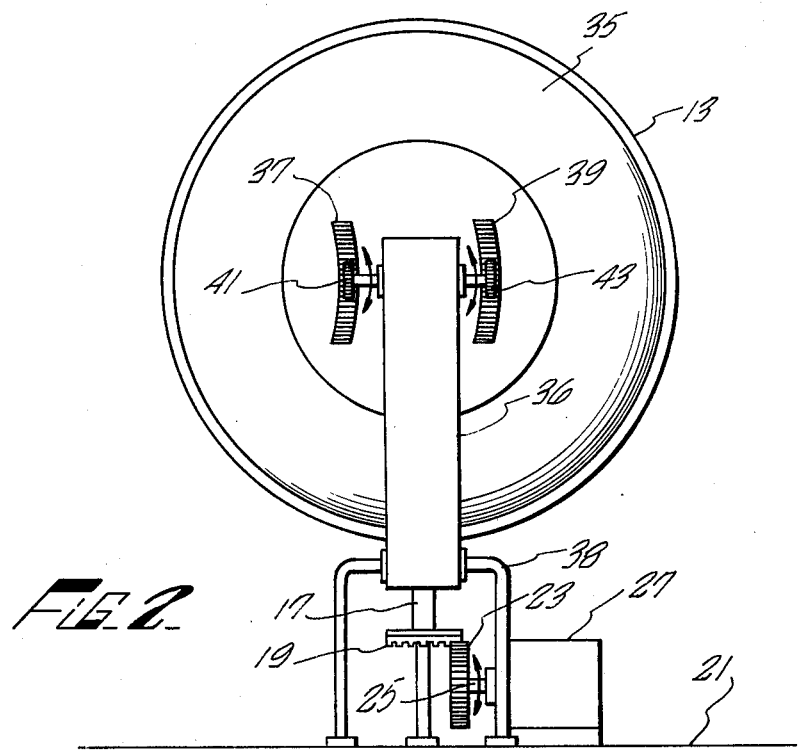
FIG. 2 is a diagramatic illustration of the back of a three-dimensional tracking concentrator generally illustrating the tracking mechanism.

The ability to select varying curvatures as shown in FIGS. 4A, 5A and 6A, or intermediate shapes, is a marked advantage when maximum temperature is to be generated in an actual heat receiver. The heat receiver, or target, cannot be a geometrical point but must have some physical dimensions, i.e., length and width, in order for it to absorb the energy being concentrated on it.

The optimum shape of a concentrator which is to be used with an energy absorbing target departs from a parabola, and will depend on the size and shape of the target used. The present invention allows for optimizing the curvature of the concentrator to the chosen target shape and size. In general the optimum shape of the concentrator will not be a true parabola, but may be the curve shown in FIG. 4A, or it may be the curve shown in FIG. 6A, or it may be some intermediate curve which can also be achieved by the means described below.

A high temperature, in the range of 600° F, low-cost three-dimensional tracking solar energy concentrator is achieved, according to the present invention, and as shown in the appended figures, by utilizing an aluminized elastomeric membrane, typically made of a polymeric material and referred to in the remainder of this description as a "polymeric film" 15, supported by a hoop 13. The curvature on the reflecting material 15 whether it be parabolic, spherical or a catenary of revolution, is obtained in a manner that will be described below. The hoop 13, supporting the reflecting film 15, is tracked in azimuth by being fixedly fastened to a shaft 17 that is attached to a circular gear 19. Gear 19 engages a gear 23 which is attached to shaft 25 of a tracking motor 27, of a type well known in the art.

The reflector film 15 supported by the hoop 13, as well as the tracking mechanism, is enclosed in a transparent plastic dome 11. The dome 11 is anchored to the ground 21 by suitable means 33 that are well known in the art. The dome 11 is slightly pressurized by a low pressure compressor 31 through umbilical cord 29. As a consequence of the transparent dome eliminating the windage forces on the reflector 15 and the light weight of the reflector 15, the tracking drive motor 27 and its associated gear train arrangement 23 and 19 may be of a low power, low-cost type.

The reflecting surface 15 along with its supporting hoop 13 may be attached to a light-weight backing dish 35 with a pair of tracks 37 and 39 having a predetermined curvature in a vertical plane attached thereto. The teeth of gear wheels 41 and 43 engage their respective tracks 37 and 39. When the gear wheels are turned by a suitable means (not shown) the reflecting surface, its supporting hoop member 13 and backing dish 35 will be caused to move in elevation.

A hollow support column 36 having legs 38 attached thereto supports the reflector and the tracking gear train. The backing dish 35 may be attached to the support column 36 by a suitable means such as a gimbal which provides freedom of movement in azimuth and elevation or a more restricted sliding tongue and groove arrangement. The above is only an example of a tracking mechanism. The exact means for accomplishing tracking movement of the reflector surface 15 and its supporting structure 13 and 35 are seen as being well within the purview of a person of ordinary skill in the art and will not be further discussed.

The polymeric film 15 that forms the reflecting surface of the concentrator of the present invention is preferably an aluminized polymeric plastic which has a high modulus of elasticity such as a surface-cross-linked polymer or a polymer-metal composite. This plastic film is mounted on a supporting hoop 13 which in turn is fastened to a backing dish 35 in a manner that forms a sealed interior 49 between the reflecting surface 15 and the backing dish 35. By drawing a vacuum on this formed interior 49 by means of a suitable vacuum pump 45, through umbilical cord 47, the highly elastic reflecting surface 15 is deflected in a convex manner as illustrated by dashed lines 46, thereby forming a three-dimensional concentrating surface.

The reflecting surface 15 can be shaped into a surface curvature that can be either a catenary of revolution 53, a parabolic dish 57 or a hemi-spherical dish 61, depending on the loading on the surface of the reflecting membrane 15. A catenary of revolution 53 is produced if the load forces 55 on its surface are uniformly distributed per unit of surface area. If the load forces 59 are uniformly distributed per unit area of the projected span, the parabolic dish 57 is produced. If the loading forces 63 are applied uniformly and normal to the reflecting surface, a hemi-spherical dish 61 is produced.

We will first describe the method of obtaining the desired curvature, catenary, parabolic or hemi-spherical, by the method of using a uniform pneumatic pressure on a non-uniform radial distribution of thickness of the film.

The load required for a catenary of revolution 53 can be produced by evacuating the underside of the film 15, in interior 49, to cause pneumatic pressure on the outside to act as a loading force. However, the pneumatic pressure created is a uniform pressure that is normal to the surface of the film, thereby tending to create the hemi-spherical dish 61. In order to provide the load diagram 55, plastic masses are added to the undersurface of the film by selectively spraying a dissolved plastic by means of a gas propellant, such as the well-known Krylon, on the underside of the film.

By varying the non-uniform radial distribution of thickness produced by spraying on the dissolved plastic, the final shape may be made, alternately, to approach the parabolic dish shape 57, when desired.

We will next describe the method of obtaining the desired curvature, catenary, parabolic or spherical by the method of using a film of uniform thickness but applying a non-uniform pressure. This non-uniform pressure is obtained by using a uniform pneumatic pressure with localized electric or magnetic force fields. The localized force fields are established by use of electrets, or of permanent magnets and spot coatings of magnetic iron oxide. The localized force fields provide modifications of the curvature of the reflecting film after it has assumed a uniform shape as a result of the differential pressure created by drawing a vacuum at its back side.

The field generating devices 51 are preferably located on the interior surface of the backing dish 35 adjacent to, but not touching the deflected reflecting film 15. These field generating devices 51 modify the curvature 46 of the reflecting film, after the reflecting film 15 has been deflected, as a result of the differential pressure applied to its face by the vacuum pump device 45.

The local field creating devices 51 may either be electrets acting on the polarizable dielectric material of the polymeric film itself, or may be permanent or electromagnets acting on patches of magnetic iron oxide painted on the underside of the reflecting film 15.

An electret is a permanently polarized dielectric material, for example, a piece of pure beeswax that has been subjected to an electric field of a few thousand volts per millimeter while molten, and allowed to freeze while under the influence of the electric field. This causes the beeswax to become polarized, one side thereof becoming negative, the other side positive. The plastic material of the reflector film 15 will respond to the electric field of the electret by being drawn towards it.

The load required for a catenary of revolution 53 can be produced by evacuating the underside of the reflecting member 15 to cause the pneumatic pressure on its surface to act as a loading force. However, the pneumatic pressure created is a uniform pressure that is normal to the surface of the reflecting membrane, thereby tending to create the hemi-spherical dish 61. In order to provide the load diagram 55, the location and spacing of the electrets, or alternately, permanent or electro-magnets, shown as 51 in FIG. 3 are chosen to cause the appropriate load diagram to be satisfied. In a similar manner, by varying the spacing and location of the electrets, or alternately, permanent magnets and facing magnetic iron oxide paint patches, the load diagram 59 leading to the parabolic dish may be approached, and, of course, intermediate load diagrams leading to variants of shapes 53 or 57 which may be desirable for particular heat-absorbing target sizes and shapes can be produced.

The entire assembly as was noted earlier is sheltered from wind, natural precipitation, dust or other forms of atmospheric pollutants, by enclosing it in a transparent, internally pressurized dome. The material utilized is preferably a thin polymeric material which is conveniently anchored to the ground in any well-known manner. The enclosing dome may distort and flutter in the wind but the enclosed mechanism will remain relatively free from these windage forces, operating in a slightly pressurized but quiet atmosphere. The pressure utilized would be approximately two inches of water or 0.07 psig. This pressure would have no affect on the operation of the concentrator or the tracking mechanism.

What has been described is a three-dimensional solar energy concentrator that utilizes an aluminized polymeric film which can be loaded to provide a desired curvature in addition to a method for making a three-dimensional solar energy concentrator. It should be understood, of course, that the foregoing disclosure relates only to preferred embodiments of the invention and that numerous modifications may be made therein without departing from the spirit and scope of the invention as set forth in the appended claims.

What is claimed is:

1. A three-dimensional tracking solar energy concentrator, comprising:
   a support member in the form of a circular dish;
   a flexible aluminized polymeric or elastomeric membrane fastened to said dish along its circular edge, forming a sealed interior;
   means for creating a differential pressure in the sealed interior formed by said support member and said flexible membrane; and
   means adjacent to and out of contact with said flexible membrane as shaped by the differential pressure created in the sealed interior for exerting localized filed forces at selected locations on said membrane, thereby modifying the curvature of the shaped membrane.

2. The solar energy concentrator of claim 1 wherein said means for modifying the curvature of said flexible membrane comprises a plurality of electrets adjacent but not touching selected locations on the shaped membrane.

3. The solar energy concentrator of claim 1 wherein areas of magnetic iron oxide on the underside of said flexible membrane in the formed interior; and said means for modifying the curvature of said flexible membrance comprises
   a plurality of permanent magnets mounted inside the formed interior adjacent but not touching said areas of magnetic iron oxide on said flexible membrane.

4. The solar energy concentrator of claim 1 wherein areas of magnetic iron oxide on the face of said flexible membrane; and said means for modifying the curvature of said flexible membrance comprises
   a plurality of permanent magnets mounted inside the formed interior adjacent but not touching said areas of magnetic iron oxide on said flexible membrane.

5. The solar energy concentrator of claim 2 further comprising:
   a transparent film dome, typically encompassing the concentrator mechanism, said dome being slightly pressurized and anchored to the ground.

6. The solar energy concentrator of claim 5 wherein said means for modifying the curvature of said formed flexible membrane comprises a plurality of electrets adjacent but not touching selected locations on the shaped film.

7. A method for making a low cost three-dimensional tracking solar energy concentrator, comprising:
   mounting a flexible aluminized polymeric or other membrane on a circular dish support member;
   applying a differential pressure on the side of said polymeric membrane next to the support member to shape it; and
   placing electrets adjacent to but not touching selected locations on the membrane to modify the curvature of the polymeric membrane.

8. A method for making a low cost three-dimensional solar energy concentrator, comprising:
   painting selected areas of a flexible aluminized polymeric membrane with a magnetic iron oxide paint, on the side opposite the aluminized side;
   mounting the polymeric membrane on a circular dish support member;
   applying a differential pressure on one side of said polymeric membrane to shape it; and
   placing permanent magnets adjacent but not touching the areas of magnetic iron oxide on said membrane to modify the curvature of the polymeric membrane.

9. A method for making a low cost three-dimensional solar energy concentrator, comprising:
   painting selected areas of a flexible polymeric membrane with a magnetic iron oxide;
   coating the side of the polymeric membrane having the iron oxide therein with a thin layer of aluminum;
   mounting the polymeric membrane on a circular dish support member;
   applying a differential pressure on one side of said polymeric membrane to shape it; and
   placing permanent magnets adjacent but not touching the areas of magnetic iron oxide on said membrane to modify the curvature of the polymeric membrane.

* * * * *